UNITED STATES PATENT OFFICE.

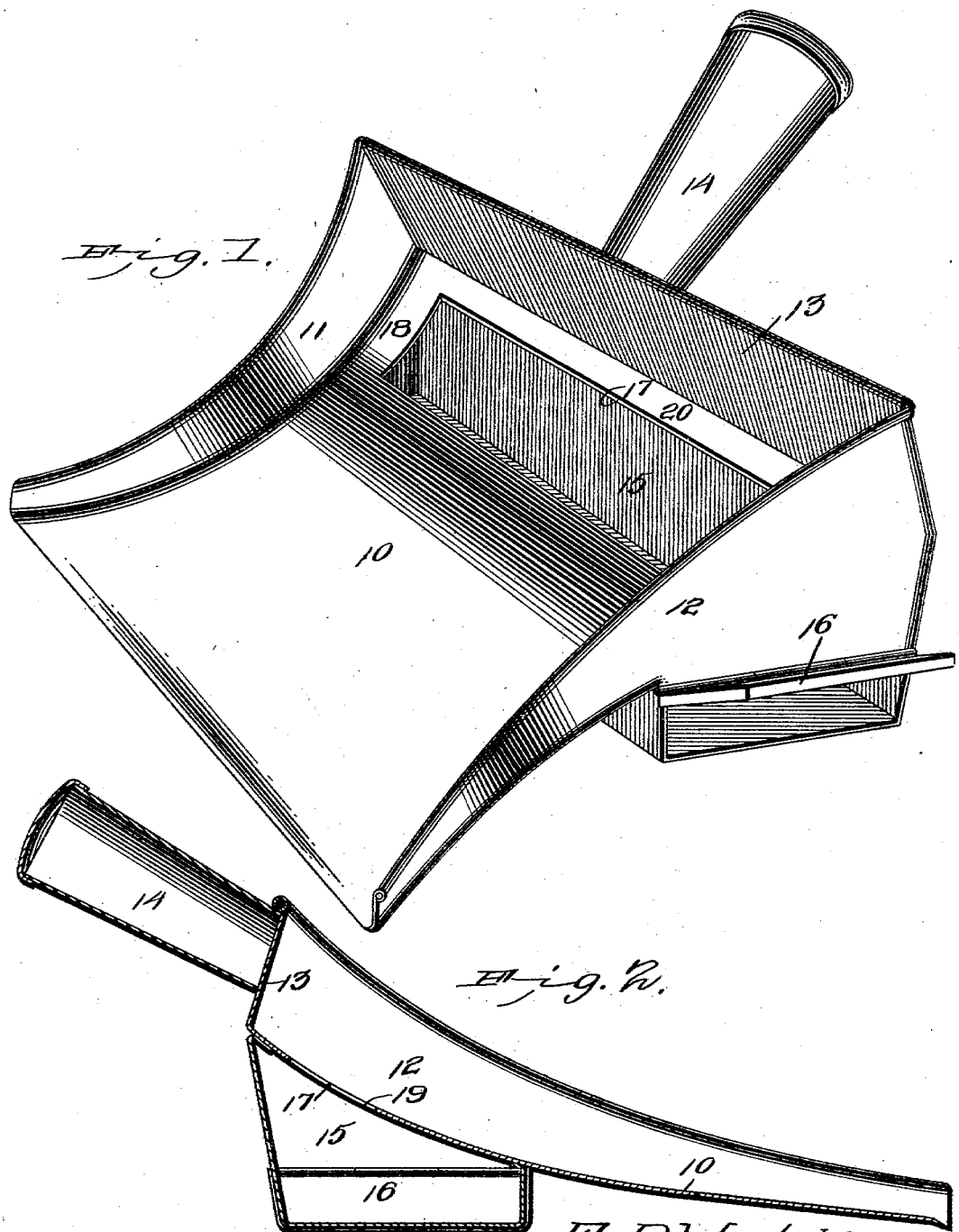

EMMA P. WADE, OF DUBUQUE, IOWA.

DUST-PAN.

SPECIFICATION forming part of Letters Patent No. 720,761, dated February 17, 1903.

Application filed June 4, 1902. Serial No. 110,230. (No model.)

*To all whom it may concern:*

Be it known that I, EMMA P. WADE, a citizen of the United States, residing at Dubuque, in the county of Dubuque and State of Iowa, have invented a new and useful Dust-Pan, of which the following is a specification.

This invention relates to dust-pans, and has for its object the production of a device whereby the dust may be swept up from the floor and deposited in the pan in a position to be free from the influence of drafts of air, so that a room may be more thoroughly swept and freed from accumulated dust.

The invention consists in a pan having a receptacle beneath the rear side, with an entrance from the pan into the receptacle, the aperture forming the connection between the pan and the receptacle being smaller than the receptacle, so that its edges overhang the receptacle on all sides and prevent the dust being blown from the receptacle after it has been deposited therein, the overhanging edges also affording a means for scraping the dust from the brush or broom, the rear edge being especially designed for this purpose.

Other novel features of the device will be disclosed in the annexed description and be specified in the claim.

In the drawings illustrative of the invention, Figure 1 is a perspective view of the device complete. Fig. 2 is a longitudinal sectional elevation thereof.

The pan portion of the device will be of the usual construction, with the flat body portion 10 and the vertical sides 11 12 and the vertical rear portion 13, the sides inclining inwardly toward the rear, as shown. The usual handle 14 will be attached to the rear side 13, as shown.

Beneath the rear part of the pan is constructed a receptacle 15, open at one end and the open end furnished with a movable cover 16, preferably hinged to the receptacle, as shown. The receptacle may be of any size and will extend entirely across the bottom of the body portion. An aperture is formed through the bottom of the pan near its rear end, leading into the receptacle, the aperture, which is represented at 17, being smaller than the receptacle 15, so that its edges overhang the receptacle on all sides. This receptacle being disposed at the rear of the pan on the bottom thereof serves as a support for the pan and to tilt the front edge thereof downward in position to closely engage the floor when in use. It will be noted that the aperture is placed a short distance inward from the rear side and that its ends do not extend to the sides 11 and 12, leaving portions 18 and 19 between the sides and the aperture and a portion 20 between the aperture and the rear side 13. This is an important feature of the invention, as by this arrangement two important results are accomplished: First, when the dust is swept upon the pan it falls into the receptacle, and the overhanging portions 18, 19, and 20 effectually prevent the dust from being blown from the receptacle by preventing the entrance of drafts of air into the receptacle or affecting the dust therein. With this device a room may be swept with the window and doors all open without danger of the contents of the dust-pan being blown therefrom, as the overhanging edges of the aperture thoroughly protect the contents of the receptacle, as above noted. The second advantage of the overhanging edges of the inlet to the receptacle is that they provide an efficient means for scraping the dust from the brush or broom to free it from the adhering particles and depositing them in the receptacle. The rear projecting edge of the flange 20 is especially effective for this purpose in that it is disposed adjacent to the rear upwardly-extending member 13 of the pan, which member acts as a stop to limit the movement of the broom and as a supporting-guide therefor when the rear edge of the opening is used as a scraper and prevents the dust from being swept or flirted out of the receptacle when the device is so used. The brush or broom may be thus effectually cleaned as often as required and the detached particles deposited in the receptacle, together with the other matter swept up. This is an important feature of the invention and adds materially to its efficiency.

The receptacle may be made of less length than the width of the pan, if preferred, but will preferably be made the full width of the pan, as shown.

The pan and receptacle may be made of any desired size or shape to adapt it for use in small or large rooms.

The device may also be employed in connection with crumb-trays to advantage.

Having thus described my invention, what I claim is—

A dust-pan having an upwardly-extending rear member forming a broom-stop, and having an opening in the bottom thereof, the rear edge of said opening being spaced away from said upwardly-extending rear member, and a receptacle disposed beneath said pan under said opening and being of a size larger than the opening, the portions of the pan-bottom adjacent to said opening forming overhanging broom-scrapers above said receptacle.

In testimony that I claim the foregoing as my own I have hereto affixed my signature in the presence of two witnesses.

EMMA P. WADE.

Witnesses:
R. E. WILKINSON,
Mrs. A. C. JOHNSON.